Patented June 18, 1935

2,005,398

UNITED STATES PATENT OFFICE 2,005,398

ESTERIFICATION OF CELLULOSE WITH A MODIFIED PERCHLORIC ACID CATALYST

Cyril J. Staud, Rochester, N. Y., and James D. Coleman, Columbus, Ohio, assignors to Eastman Kodak Company, Rochester, N. Y., a corporation of New York No Drawing. Application March 4, 1932, Serial No. 596,902

10 Claims. (Cl. 260—101)

The present invention relates to the esterification of cellulose in the presence of a catalyst comprising perchloric acid mixed with either phosphoric or nitric acid.

The use of perchloric acid alone as a catalyst in the esterification of cellulose is disclosed in U. S. Patent No. 1,645,915, but that material is a powerful catalyst and the reactions in which it is used alone are difficult to control. Because of that difficulty, that patent proposes the employment ordinarily of a salt of perchloric acid as the catalyst in the esterification mixture.

We have found that the perchloric acid itself may be employed as the catalyst in processes for the esterification of cellulose, which allow of control, if an auxiliary material which inhibits or dampens the violent action of the perchloric acid is employed therewith. We have found that nitric acid and orthophosphoric acid are eminently suited to retard the activity of perchloric acid as a catalyst in cellulose esterification processes. The retarding action of these inhibiting agents appears to increase according to the amount of the retardant which is present. For example the addition of phosphoric acid may be carried to the point where the catalytic activity of the perchloric acid is so retarded that incomplete esterification results. It is therefore preferable to adjust the amount of retardant or inhibiting agent employed to secure the proper balance of the reactive materials so that there will not be a preponderance of perchloric acid with the resultant brittleness of the films subsequently obtained, nor an amount of retardant so great as to preclude complete esterification with incipient gel formation, which would also give a product which would form brittle films. Obviously in some cases sheets or skins of a brittle nature are desirable so that in those instances restriction of the proportions of the ingredients which go to make up the catalyst mixture would be unnecessary.

The catalysts which we disclose may be employed in any of the known processes for the acylation of cellulose in which a catalyst is required. The catalyst may be introduced into the reaction bath by incorporating it in the pretreatment liquor or if desired the catalyst may be added directly to the esterification bath in processes in which the cellulose is pretreated or in processes in which the pretreatment step is omitted.

The following example illustrates the application of our catalyst to one type of acylation and is in no way intended to limit the scope of the invention:

50 lbs. of cotton linters were thoroughly mixed with 350 lbs. of acetic acid containing about 1.7 lbs. of 72% perchloric acid and 1-2 lbs. of 85% orthophosphoric acid. The mixture was allowed to stand at about 100° F. for 4 hours. The mixture was then cooled to about 60° F. and 150 lbs. of 85% acetic anhydrid was added after which the temperature was raised to 100° F. progressively over a period of about 8 hours. A smooth, light colored, highly viscous solution or dope, free from grain and fiber was obtained. However, in cases where the fiber has not entirely dissolved in 8 hrs. the reaction conditions may be continued a few hours until solution has taken place.

The solution or dope obtained was then hydrolyzed by adding a mixture consisting of 2½ lbs. of 35% hydrochloric acid, 26½ lbs. of water and 42 lbs. of acetic acid and maintaining the resulting mixture at 100° F. for 55 hrs. The cellulose acetate formed was precipitated from the dope by pouring it into the water, and the product was then washed and dried.

It was found that when the product was dissolved in acetone and coated out in the form of a skin or sheet, it gave a flexibility of approximately 5 folds on a Schopper fold tester, (which instrument is commonly used to determine the flexibility of sheets of cellulose derivatives). If however a cellulose acetate is prepared according to the above example except that 3 grams of orthophosphoric acid is employed, the skins or sheets from the acetone solutions of that ester will be found to be brittle.

As stated above, nitric acid may also be employed as a retardant in the esterification of cellulose. We have found, however, that the retarding or inhibiting power of nitric acid when used with perchloric acid is not so great as that of phosphoric acid so that the employment of a greater quantity of nitric acid is necessary. For instance, if nitric acid is substituted for phosphoric acid in the above example about 3 to 7½ lbs. of nitric acid must be employed instead of only 1-2 lbs. of phosphoric acid.

As mentioned above our catalysts are useful in various methods of esterification of cellulose such as fibrous processes, processes containing pretreatment steps, processes in which there is no pretreatment, etc. Also, our catalysts may be employed in various processes which differ as to the ingredients of the esterification bath, such as for example, processes which employ an anhydrid which impels the esterification and also itself esterifies the cellulose, such as an unsubstituted fatty acid anhydrid, or processes in which an anhydrid is used which impels the esterification but does not itself contribute acyl groups to the cellulose such as chloracetic, alkoxyacetic or like anhydrides, which are derived from substituted fatty acids. Our catalysts may also be employed in esterification processes in which a higher ester of cellulose either simple or mixed is produced such for example as in those processes disclosed in U. S. patent to Clarke and Malm No. 1,800,860 for making the higher esters of cellulose. Our catalysts may also be employed in cellulose acylation processes in which the anhydride of higher fatty acid such as propionic or butyric is employed to produce the simple cellulose acylates or a mixed ester such as a cellulose acetate-higher acylate.

Our catalyst is also suitable for processes of making cellulose esters in which a cellulose derivative having free hydroxyl groups is employed as the starting material instead of cellulose itself. For example, the cellulosic material initially employed may be a cellulose nitrate having a low nitrogen content or a partially acetylated cellulose having free and available hydroxyl groups. Cellulose ethers such as ethyl cellulose or the benzyl ethers of cellulose having available hydroxyl groups may be employed. In cases where these cellulose derivative materials are employed initially mixed esters or ether-esters will be produced unless of course that material should be further esterified with the same kind of acyl groups as are already present.

Obviously the temperatures, proportions, time, ingredients, etc., in cellulose esterification processes in which our catalysts are used may be varied as desired according to the particular process and the judgment of the individual operator. The variation or modification of any of the processes referred to herein is permissible without departing from the scope of our invention providing our modified perchloric acid catalyst is employed. Various other modifications of our invention will be apparent to those skilled in the art.

The term "catalytic inhibitor" is employed herein to refer to phosphoric acid, nitric acid or equivalent materials which inhibit or retard the action of perchloric acid when it is employed as a catalyst in the esterification of cellulose.

What we claim as our invention is:

1. The acylation of cellulosic material having free and esterifiable hydroxyl groups in the presence of a catalyst essentially consisting of a mixture of perchloric and phosphoric acids.

2. The acylation of cellulosic material having free and esterifiable hydroxyl groups in the presence of a catalyst essentially consisting of a mixture of perchloric and nitric acids.

3. The acylation of cellulosic material having free and esterifiable hydroxyl groups in the presence of an organic acid anhydride and a catalyst essentially consisting of a mixture of perchloric and phosphoric acids.

4. The acylation of cellulosic material having free and esterifiable hydroxyl groups in the presence of an organic acid anhydride and a catalyst essentially consisting of a mixture of perchloric and nitric acids.

5. The acetylation of cellulosic material having free and esterifiable hydroxyl groups in the presence of a catalyst essentially consisting of a mixture of perchloric and phosphoric acids.

6. The acetylation of cellulosic material having free and esterifiable hydroxyl groups in the presence of a catalyst essentially consisting of a mixture of perchloric and nitric acids.

7. A cellulose esterification catalyst essentially consisting of perchloric acid and a mineral acid selected from the group consisting of phosphoric and nitric acids.

8. An esterification catalyst essentially consisting of a mixture of perchloric and phosphoric acids.

9. An esterification catalyst essentially consisting of a mixture of perchloric and nitric acids.

10. The acylation of cellulosic material having free and esterifiable hydroxyl groups in the presence of a catalyst essentially consisting of perchloric acid and a mineral acid selected from the group consisting of phosphoric and nitric acids.

CYRIL J. STAUD.
JAMES D. COLEMAN.